United States Patent [19]

Yanagawa et al.

[11] Patent Number: 4,616,126

[45] Date of Patent: Oct. 7, 1986

[54] INFORMATION RETRIEVAL SYSTEM

[75] Inventors: Hitoshi Yanagawa, Tokyo; Yasutoshi Sugita, Urayasu; Satoshi Ono, Yokohama; Masami Maetani, Ohmiya; Tomoo Tsunenari, Tokyo, all of Japan

[73] Assignee: Canon Kabushiki Kaisha, Tokyo, Japan

[21] Appl. No.: 633,293

[22] Filed: Jul. 23, 1984

[30] Foreign Application Priority Data

Aug. 1, 1983 [JP] Japan .................................. 58-140898
Dec. 12, 1983 [JP] Japan .................................. 58-234077

[51] Int. Cl.⁴ .............................................. G06F 15/20
[52] U.S. Cl. .................................... 235/375; 235/436; 235/477; 353/26 A
[58] Field of Search ............... 235/375, 436, 476, 477; 353/26 A

[56] References Cited

U.S. PATENT DOCUMENTS

3,999,846 12/1976 Sone et al. ......................... 353/26 A
4,139,898  2/1979 Tanaka .............................. 353/26 A
4,453,823  6/1984 Sugita et al. ..................... 353/26 A
4,514,641  4/1985 Tanaka et al. .................... 353/26 A Primary Examiner—David L. Trafton
Attorney, Agent, or Firm—Fitzpatrick, Cella, Harper & Scinto

[57] ABSTRACT

An information retrieval system for retrieving desired information from information recorded in a record medium is disclosed. The information on the record medium is classified into at least two groups and a first mark is added to the lower class information and a second mark is added to the higher class information. The marks are detected by mark detection means and the feed of the record medium is controlled in accordance with the output of the mark detection means. When there is an error in the retrieval or in the input, the error is detected and the feed of the record medium is stopped.

13 Claims, 15 Drawing Figures

INFORMATION RETRIEVAL SYSTEM

BACKGROUND OF THE INVENTION

1. Field of the Invention

The present invention relates to an information retrieval system for retrieving desired information from a record medium such as a film having information recorded thereon.

2. Description of the Prior Art

In a film used in a retrieval apparatus incorporated in a microfilm reader, a counting mark is printed on an edge of each frame of the film and desired information on the film is automatically retrieved by counting the marks.

In such a retrieval apparatus, the marks on the film are illuminated by a lamp, the light flux from the marks when the film is moved is detected by a mark detector having a photo-electric conversion element, output signals of the mark detector are counted by a counter, the count of the counter is compared with a desired frame number inputted by a keyboard by a comparator, and the comparator generates a stop signal to a drive control circuit when both counts are equal to stop a drive system for the film so that the desired frame is stopped at a predetermined position to project it on a screen.

Many types of films are used in such an information retrieval system.

Figure 1A:
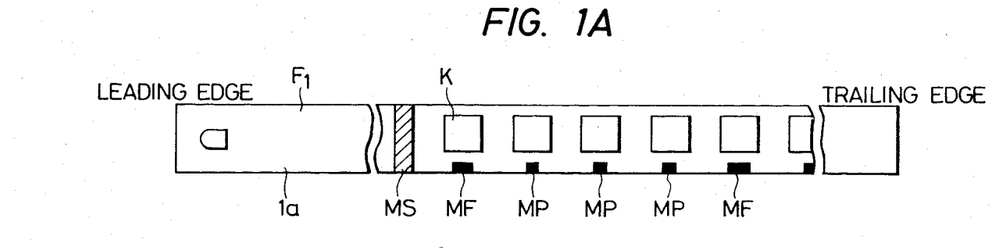
FIGS. 1A and 1B are front views of microfilms used in the present invention.

FIGS. 1A and 1B show examples of the films used in the retrieval apparatus. A film F1 shown in FIG. 1A has first, small marks MP printed on the edge of lower class information frames and second large marks MF printed on the edge of higher class information frames. The second marks MF are used to retrieve information classified in a medium class (high class) and the first marks MP are used to retrieve information classified in a minor class (low class). For example, when part drawings of an automobile are recorded on a film, the structure of the automobile is divided into several units and the frames having developed views of the respective units recorded thereon are marked with the second marks MF indicating the medium class, and part charts, part numbers and part prices of each unit are recorded on one or more frames following that which has the developed view of the unit recorded thereon, and the first marks MP indicating the minor class are marked on the edges of the frames for the part charts, etc. When such a film is used, a frame having a desired unit developed view recorded thereon can be retrieved by detecting the second mark MF, and frames having desired part charts, part numbers or part prices recorded thereon in the desired unit can be retrieved by detecting the first marks MP. Assuming that one unit constitutes one group of information, one group of information consists of one or more frames on which images of associated information contents are recorded.

Figure 1B:
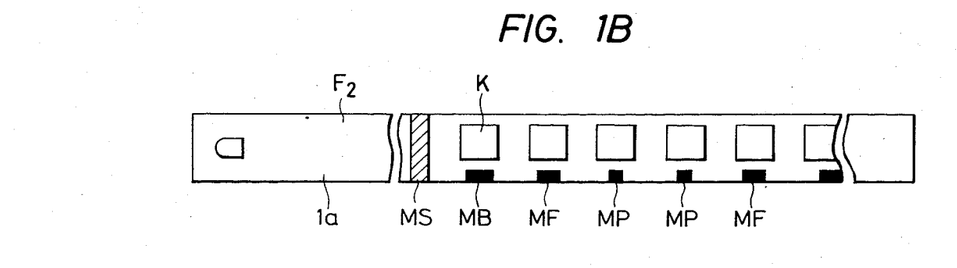

A film F2 shown in Fig. 1B has first small marks MP for a low class, second medium marks MF for an intermediate class and third large marks MB for a high class. The third mark MB is used to retrieve information of a major class, the second mark MF is used to retrieve information of a medium class and the first mark MP is used to retrieve information of a minor class. For example, when part charts of automobiles are recorded on a film, three types of marks are selectively recorded on the edges of the respective frames so that types of automobiles, unit developed charts and part charts can be retrieved. When this film is used, a desired automobile construction chart can be retrieved by detecting the third mark MB, a desired unit developed chart can be retrieved by detecting the second mark MF and a desired part chart can be retrieved by detecting the first mark MP. Hereinafter, the first mark MP indicating the low class information is referred to as a page mark, the second mark MF indicating the medium class information is referred to as a file mark and the third mark MB indicating the high class information is referred to as a batch mark. When information is retrieved by using the film having two or more types of marks, the information in the desired class can be automatically retrieved by counting the marks of the selected class. For example, a frame of a desired file can be retrieved by counting the file marks, and a frame of a desired batch can be retrieved by counting the batch marks.

Besides the automatic retrieval method for retrieving the desired information described above, there is another method in which if an address of a low class frame in desired information is not known, it is retrieved by intermittently feeding the frames having the low class marks attached thereto and displaying the information of the frames on a screen frame by frame. (This retrieval method is called a Browsing retrieval.) When required information is to be retrieved by the Browsing retrieval by watching each frame in the desired file (or batch), the film is stopped for a predetermined time period each time the page mark (or file mark) is detected, then the film is fed and stopped again for the predetermined time period when the next page mark (or file mark) is detected, and the above operation is repeated for each frame. However, if the requested information is overlooked, the user notices that fact only while viewing information in another file (or batch) or when the film has been completely fed from a supply reel to a take-up reel.

In the automatic retrieval method in which an address (data) of a desired information frame is entered by information frame address input means such as a keyboard, if an incorrect address, for example, an address which does not exist in the film under retrieval, is entered by mistake, the misentry is only detected after the entire film has been fed from the supply reel to the take-up reel. Thus, a long time is required before the correct address is reentered and the correct information is retrieved. Therefore, work efficiency is low.

SUMMARY OF THE INVENTION

It is an object of the present invention to provide an information retrieval system which is free from the above problems.

It is another object of the present invention to provide an information retrieval system which can detect an erroneous retrieval work in an early stage.

It is other object of the present invention to provide an information retrieval system which can reduce the retry time for retrieval when the desired information is overlooked or an input datum is misentered, so that operability is improved.

DETAILED DESCRIPTION OF THE PREFERRED EMBODIMENTS

Figure 2:
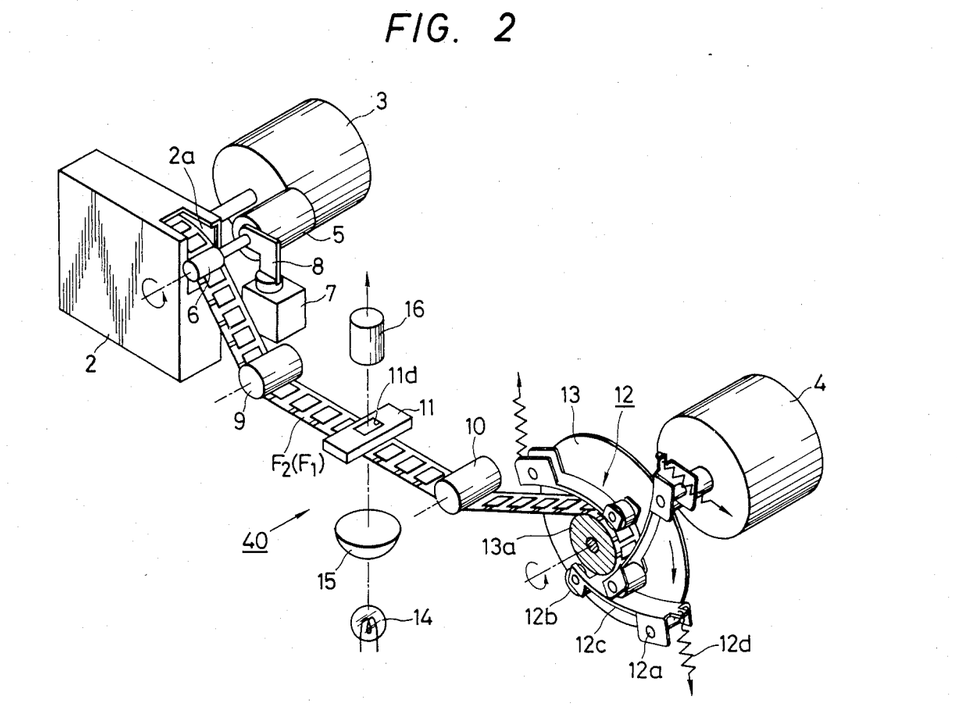
FIG. 2 is a schematic perspective view of a microfilm reader/printer in accordance with the present invention.

FIG. 2 shows a microfilm reader or printer having an information retrieval system. Numeral 2 denotes a film cartridge loaded at a predetermined position in the apparatus. A microfilm F2 (or F1) rolled on a reel is accommodated in the cartridge 2. Numeral 3 denotes a drive motor (film rewind motor) coupled to a shaft of the reel in the cartridge 2, numeral 6 denotes a film feed roller (capstan roller) arranged in the vicinity of a film exit 2a of the cartridge 2, numeral 5 denotes a drive motor coupled to a shaft of the roller 6, numerals 7 and 8 denote a solenoid and a roller support arm for vertically swinging the roller 6, numerals 9 and 10 denote first and second film guide rollers, numeral 13 denotes a film take-up reel and numeral 4 denotes a drive motor (film take-up motor) coupled to a shaft of the reel 13.

Numeral 12 denotes an automatic film wrapping mechanism which automatically wraps a leader tape 1a (FIGS. 1A and 1B) connected to a leading edge of the microfilm around a core 13a of the film take-up reel 13. In the present embodiment, the automatic film wrapping mechanism uses three pinch roller assemblies arranged around the reel core 13a at approximately equi-intervals. Each pinch roller assembly has an arcuate arm 12C which is pivotable around a shaft 12a and has a small roller 12b at a free end, and the arcuate arm 12c is biased by a tension spring 12d such that the small roller 12b is normally press-contacted to the periphery of the core 13a of the reel.

Numeral 40 denotes a projecting optical system arranged between the first and second film guide rollers 9 and 10. It comprises an illumination lamp 14, a condensing lens 15, a film mark detector 11 and a projection lens 16.

When the film cartridge 2 is loaded in the apparatus and an auto-loading button (not shown) is depressed, the motors 5 and 4 are energized and the roller 6 is driven to feed out the film and the film take-up reel 13 is driven to take up the film. The solenoid 7 is also energized so that the roller support arm 8 is moved downward and the roller 6 is moved to a film path of the film exit 2a of the cartridge 2. The lamp 14 is turned on.

The leading edge of the leader tape 1a connected to the leading edge of the film in the cartridge 2 is fed out by the film feed roller 6, and by virtue of stiffness of the leader tape 1a, it is fed by the rotation of the roller 6 to the first film guide roller 9, the underside of the mark detector 11, the second film guide roller 10, the film take-up reel 13 and the core 13a of the reel 13, and the leader tape 1a of the film is automatically wrapped around the core 13a by the mechanism 12.

Guide plates (not shown) for forming film travel paths are arranged between the film feed roller 6 and the first film guide roller 9, between the first and second film guide rollers 9 and 10, and between the second film guide roller 10 and the film take-up reel 13.

As the leader tape 1a at the leading edge of the film is fed into the take-up reel 13 and wrapped around the core 13a by the film auto-loading mechanism and a block start mark MS (FIGS. 1A and 1B) at the junction of the trailing edge of the leader tape 1a and the leading edge of the film 1 reaches an aperture 11d of the mark detector 11, it is detected by a mark detection element in the mark detector 11 and the motor 5 and the solenoid 7 are deenergized in response to the detection signal. Thus, the rotation of the film feed roller 6 is stopped and the roller 6 is escaped upward from the film F2 and held at a non-active position relative to the film F2. The motor 4 is also deenergized and the rotation of the film take-up reel 13 is stopped. The film in the cartidge 2 is thus stopped when the start mark MS has reached the aperture 11d of the mark detector 11 after the film has been automatically loaded to and wrapped around the take-up reel 13.

Figure 3:
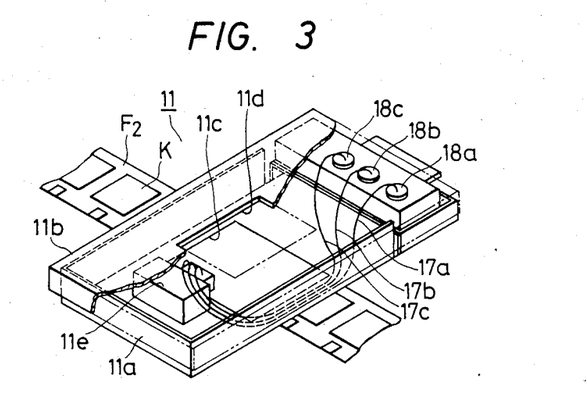
FIG. 3 is a perspective view, partly taken out, of a mark detector.

FIG. 3 shows an enlarged perspective view, with some part cut away, of the mark detector 11. The present embodiment uses an optical fiber. Numeral 11a denotes a case of the mark detector which is a shallow parallelepiped with an open top. Numeral 11b denotes a cover case which covers the case 11a. Numeral 11c denotes an aperture formed at the center of the bottom of the case 11a. The aperture is larger than an information frame. Numeral 11d denotes an aperture formed at a center of the top of the cover case 11b. It is of substantially the same size as the information frame. The film F2 travels below the aperture 11c of the case 11a. Numerals 17a, 17b and 17c denote optical fibers. One end of each of those optical fibers is held by a holding member 11e arranged along a lower side of the aperture 11c of the case 11a so that the end is exposed downward to the aperture along the lower side of the aperture. The lower edges of the marks MB, MF and MP and the start mark MS on the lower edge of the film F2 pass under the downward ends of the three optical fibers 17a, 17b and 17c. Numerals 18a, 18b and 18c denote photo-transistors to which the other ends of the optical fibers 17a, 17b and 17c are connected. An optical axis of the projecting optical system 40 passes through the center of the aperture 11c of the case bottom plate and the center of the aperture 11d of the cover case top plate.

Figure 4:
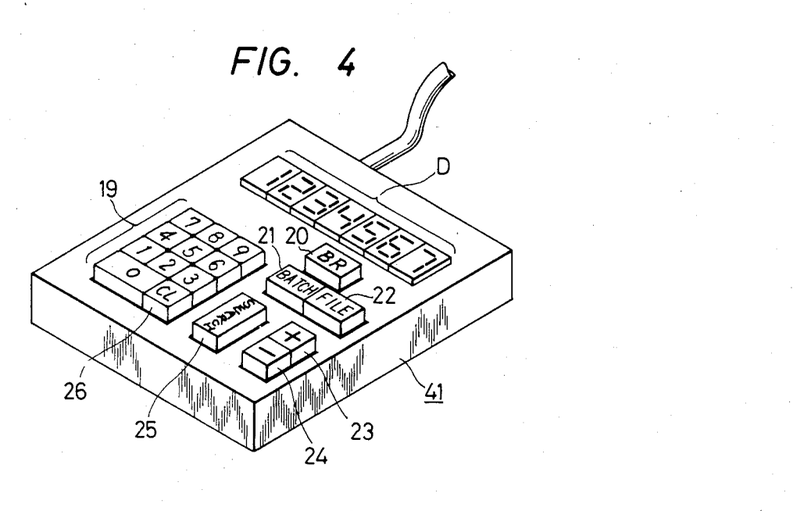
FIG. 4 is a perspective view of a key box.

FIG. 4 is a perspective view of the key box 41 (or a console panel) which serves as information frame address input means. Numeral 19 denotes a ten-key for inputting numbers for the batch, file and page, numeral 20 denotes a BR key which is depressed when the Browsing retrieval is required, numerals 21 and 22 denote a batch key and a file key which are depressed when the batch number and the file number are inputted by the ten-key 19, numeral 25 denotes a search key for starting the retrieval after the required information frame address (retrieval data) has been inputted by the ten-key 19, the batch key 21 and the file key 22, numerals 23 and 24 denote a forward shift key ((+) key) for the film information frame and a backward shift key ((−) key), symbol D denotes a display on which the input information frame address and an error are displayed, and numeral 26 denotes a clear key.

The required information address is inputted to the control circuit 27 through the key box 41. For example, when the information frame in batch 3, file 1 and page 2 is to be retrieved, "3" is entered by the ten-key 19 and the batch key 21 is depressed, then "1" is entered and the file key 22 is depressed, and then "2" is entered. Thus, the required information frame address is entered. The entered frame address is displayed on the display D.

When the retrieval mode for the film is a 2-level blip mode for the file and the page, the file number is entered and the file key 22 is depressed, and then the page number is entered. When the retrieval mode is a 1-level blip mode for the page, only the page number is entered (the keys 21 and 22 are not used).

In this manner, the frame address is entered and then the search key 25 is depressed. Thus, the auto-loading of the roll film F2 and the autowrapping of the leader tape 1a at the leading edge of the film around the core 13a of the take-up reel 13 are started, the start mark MS of the film F2 is positioned at the aperture 11d of the mark detector 11, and the film take-up motor 4 of the apparatus is energized. Thus, the film take-up reel 13 is driven and the film F2 on the cartridge 2 is fed toward the take-up reel 13. (This is referred to as a forward feed.) As the film F2 is fed, the marks on the lower edges of the respective frames sequentially pass under the downward ends of the three optical fibers 17a, 17b and 17c of the mark detector 11, and the intermittent light signals applied to the optical fibers 17a, 17b and 17c as the film F2 is fed are supplied to the photo-transistors 18a, 18b and 18c where they are converted to electrical signals. The types of the marks MB, MF and MP of the frames which sequentially pass under the mark detector 11 are discriminated and the numbers of marks are counted by the retrieval control circuit including a microcomputer so that the required information frame is automatically retrieved. When the information frame of the requested address reaches the apertures 11c and 11d of the mark detector 11, the rotation of the take-up reel 13 is automatically stopped and a still image of the requested information frame is projected on a screen (not shown) by the projection lens 16. By depressing a print button, the operator causes the image of the frame to be projected on a photosensitive medium and a print is made. The image of the retrieved information frame may be read by an image pickup device to convert it to an image signal, which is supplied to a display device such as a CRT display to display the information.

Figure 5:
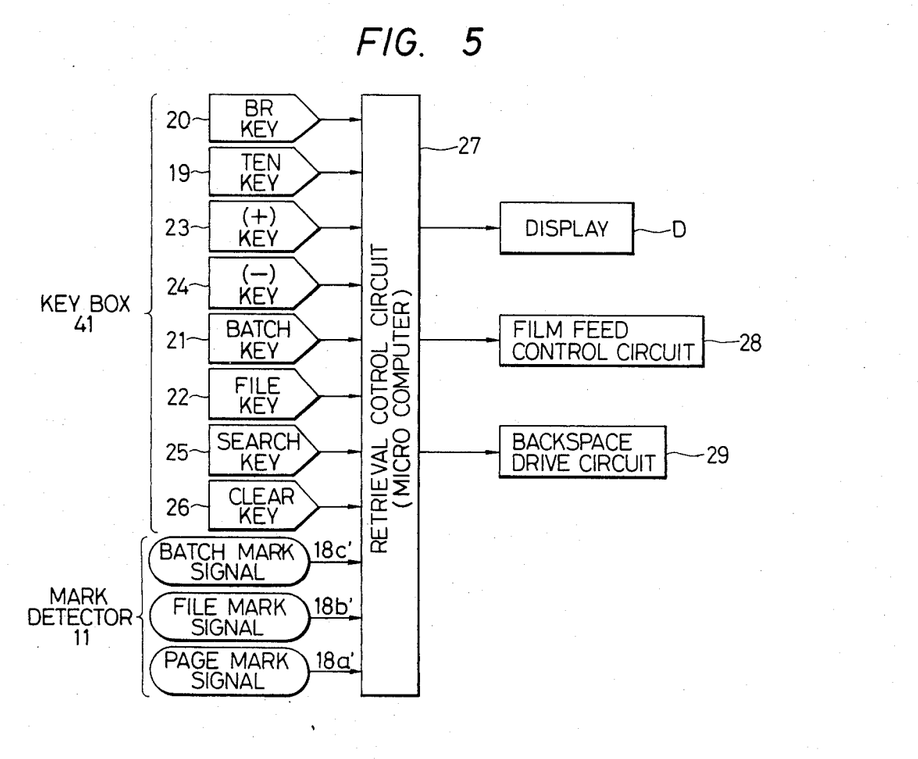
FIG. 5 is a block diagram of a retrieval circuit.

FIG. 5 shows a block diagram of the retrieval circuit. Numeral 27 denotes a retrieval control circuit including a microcomputer. The inputs thereto are a page mark signal 18a', a file mark signal 18b' and a batch mark signal 18c' from the mark detector 11, and key signals from the ten-key 19, the BR key 20, the batch key 21, the file key 22, the (+) key 23, the (−) key 24, the search key 25 and the clear key 26 on the key box 41. The outputs are supplied to the display D, the film feed control circuit 28 and the backspace drive circuit 29.

Figure 6:
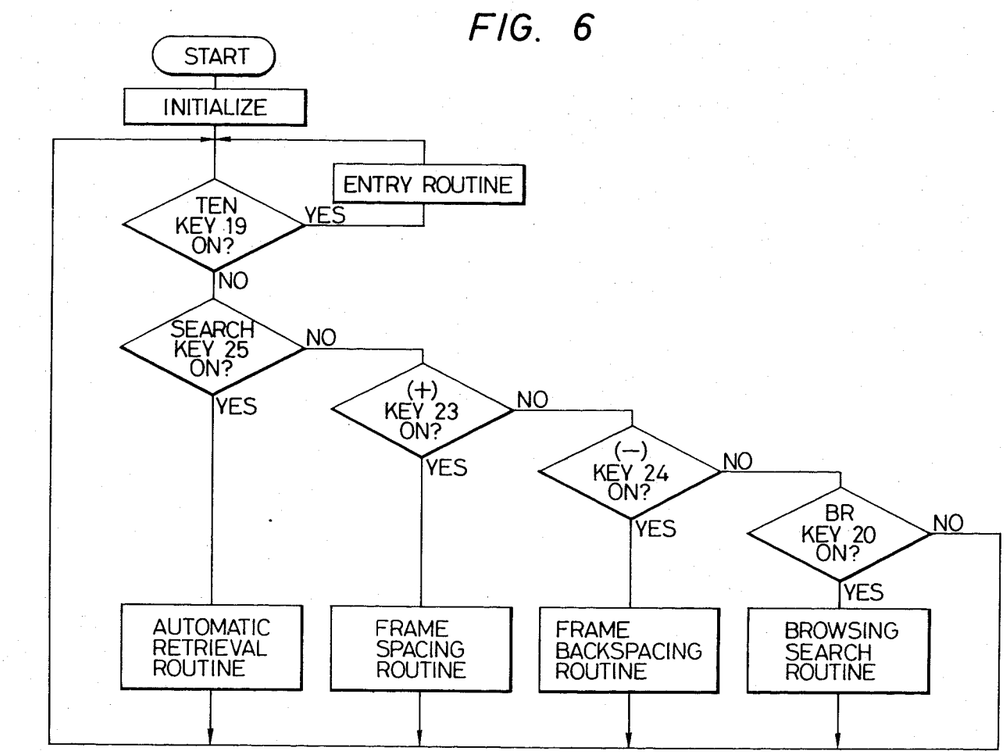
FIG. 6 is a flow chart for a retrieval operation.

FIG. 6 shows a flow chart for the retrieval operation. When the auto-loading button is depressed after a power switch is turned on, the autoloading is carried out and initialization is started.

Next, it is checked if the ten-key 19 has been depressed. If it has been depressed, the process jumps to an entry routine where the number entered by the ten-key 19 is displayed on the display D. If the ten-key 19 has not been depressed, the depression of the keys 20, 21, 22 and 23 is checked, and if any one of them has been depressed, the process jumps to a corresponding routine to carry out the retrieval operation.

Figure 7:
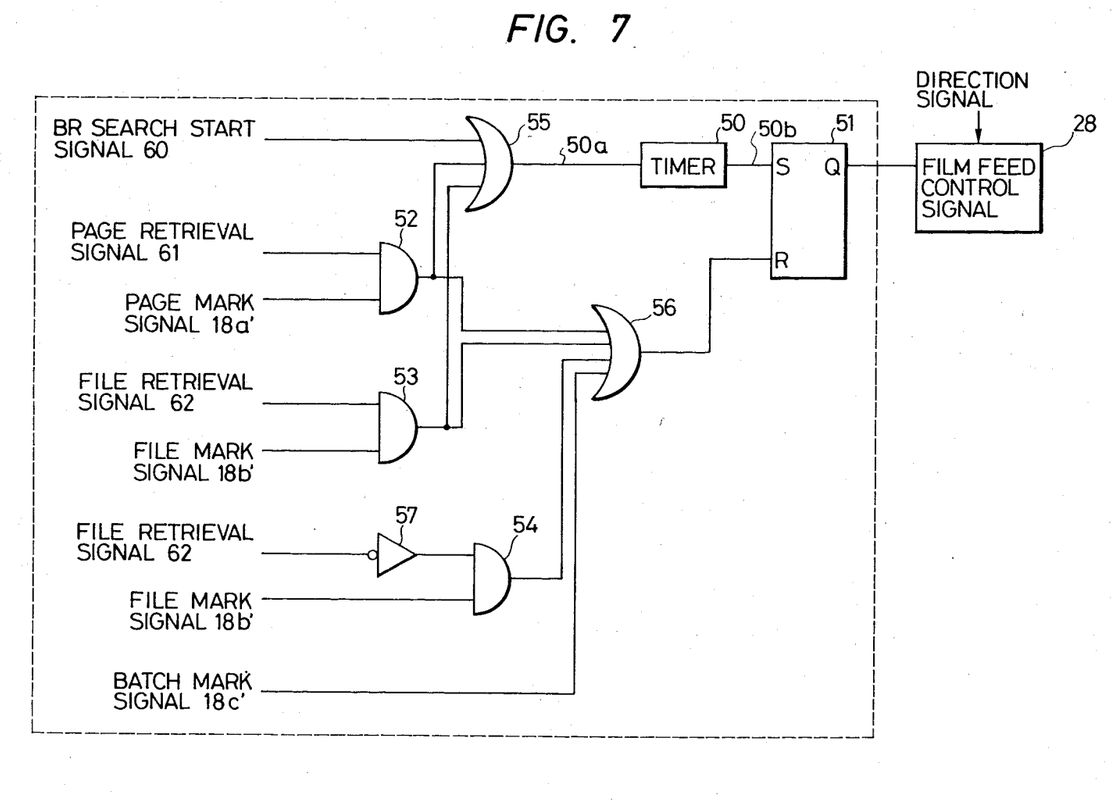
FIG. 7 is a block diagram of a retrieval control circuit for a Browsing retrieval.

FIG. 7 shows a block diagram of a retrieval control circuit for the Browsing retrieval. Numeral 50 denotes a timer, numeral 51 denotes a flip-flop circuit, numerals 52–54 denote AND gates, numerals 55 and 56 denote OR gates and numeral 57 denotes an inverter.

When the Browsing retrieval is to be performed by utilizing the page marks, the BR key 20 and the (+) key 23 or the (−) key 24 are depressed in this sequence. When the Browsing retrieval is to be performed by utilizing the file mark, the BR key 20, the file key 22 and the (+) key 23 or the (−) key 24 are depressed in this sequence. When the BR key 20 and the (+) key 23 or the (−) key 24 are depressed, a high level or a logical "1" BR retrieval start signal 60 is applied to an input line of the OR gate 55 and a "1" page retrieval signal 61 is applied to an input line of the AND gate 52. When the BR key 20, the file key 22 and the (+) key 23 or the (−) key 24 are depressed, the "1" BR retrieval start signal 60 is applied to the input line of the OR gate 55 and a "1" file retrieval signal 62 is applied to input lines of the AND gate 53 and the inverter 57. The timer 50 is started when a "1" signal is applied to an input terminal 50a and produces a "1" signal at an output terminal 50b a predetermined time later, and then it is reset to an initial state. The page retrieval signal 61 and the file retrieval signal 62 are "1" during the Browsing retrieval.

When the (+) key 23 is depressed, a direction signal to drive the motor 4 to feed the film forward is supplied to the feed control circuit 28, and when the (−) key 24 is depressed, a direction signal to drive the motor 3 to feed the film backward is supplied to the feed control circuit 28.

Figure 8:
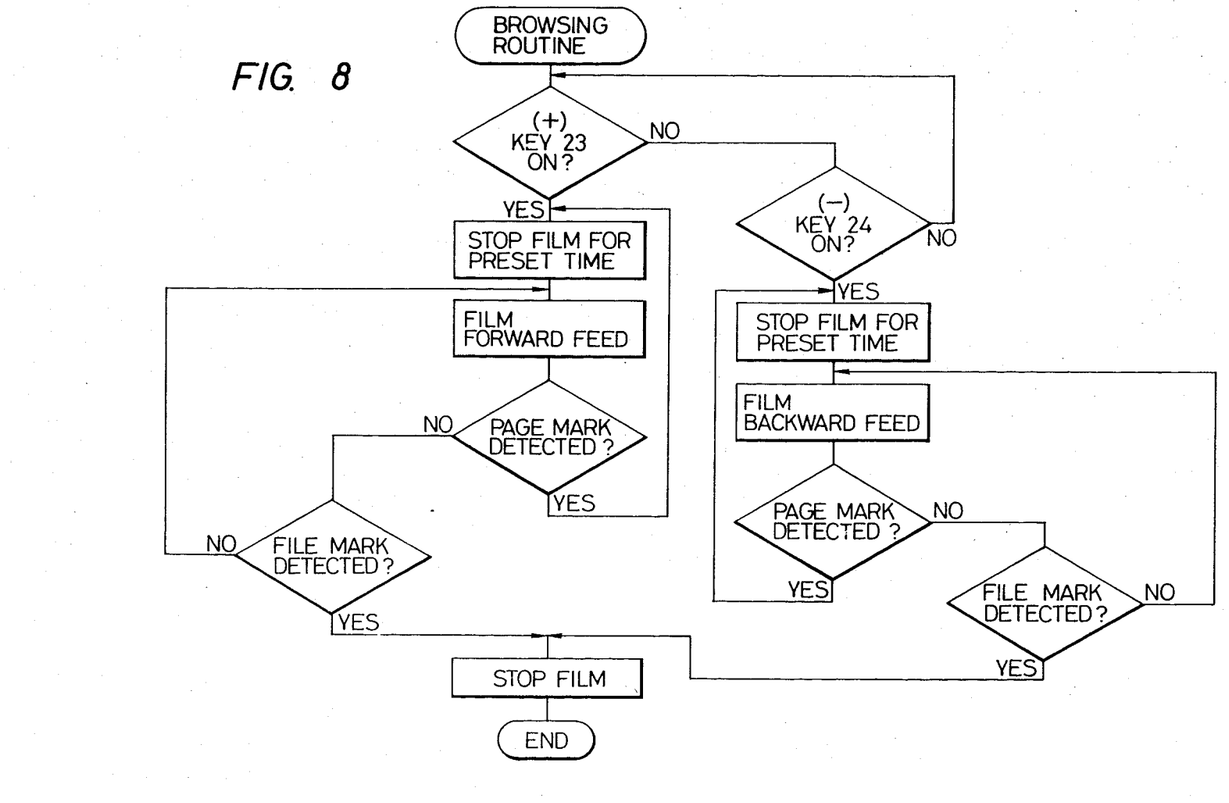
FIG. 8 is a flow chart for a Browsing retrieval operation.

FIG. 8 shows a flow chart for the Browsing retrieval by the page marks. Let us assume that a leading frame of a desired file in the film F2 is retrieved and the information frames in this file are reviewed frame by frame. When the BR key 20 is depressed and then the (+) key 23 is depressed, the BR retrieval start signal 60 is generated and the timer 50 is started thereby. The film is stopped for a time preset in the timer 50 and then the timer 50 produces the "1" output signal which sets the flip-flop 51, which in turn produces the "1" output at a Q-terminal. The "1" output signal is supplied to the feed control circuit 28 so that the motor 4 is driven and the film F4 is forward fed. If the mark detector 11 produces the page mark signal 18a' during the forward feed, the AND gate 52 produces the "1" output which resets the flip-flop 51 so that the motor 4 is deenergized and the film F2 is stopped. On the other hand, the timer 50 is started by the "1" signal produced by the AND gate 52 and the timer 50 produces the "1" output the preset time later so that the flip-flop 51 is set, the motor 4 is again energized and the film F2 is again fed. Accordingly, during the Browsing retrieval, the feed and the stop of the film are periodically repeated and the user can review the information of the frame each time the film is stopped. By changing the preset time of the timer 50, the review time may be varied.

If the desired frame is overlooked during the Browsing retrieval and when the mark detector 11 detects the file mark at the leading frame of the adjacent file to the desired file, the file mark signal 18b' is produced and the AND gate 54 produces the "1" output. Thus, the flip-flop 51 is reset, the motor 4 is stopped and the film feed is stopped. Accordingly, during the Browsing retrieval of the frames of the desired file by utilizing the low class page marks, if the high class file mark, that is, the file mark of another file is detected, the film feed is stopped so that the overlook of the desired frame is noticed to the user. The user then depresses the BR key 20 and the (−) key 24 so that the film is fed backward and the Browsing retrieval is performed. The user thus can retrieve the overlooked desired frame. When the BR key 20 and the (−) key 24 are depressed, the operation is same as that of the depression of the BR key 20 and the (+) key 23 except that the film is fed backward. A misretrieval may be displayed on the display D by the "1" signal from the AND gate 54 or the batch mark signal 18c′ when the film feed is inhibited.

In the above embodiment, the page marks are used for the Browsing retrieval. Alternatively, the file marks may be used for the Browsing retrieval. For example, when information in a desired batch is retrieved and then information in a desired file in the batch is to be Browsing-retrieved, the file marks are detected to stop the frames having the file marks printed thereon for the preset time, and the film feed is inhibited if the batch mark is detected during the retrieval so that the sequential retrieval of the frames in the wrong batch is prevented and the erroneous retrieval operation is prevented from lasting long time.

As described above, during the sequential retrieval of the frames by utilizing the low class marks of the desired information, if the high class mark is detected, the film feed is inhibited so that the sequential retrieval of the frames in the wrong class is prevented, the retrieval time is reduced and the misretrieval is prevented.

Figure 10:
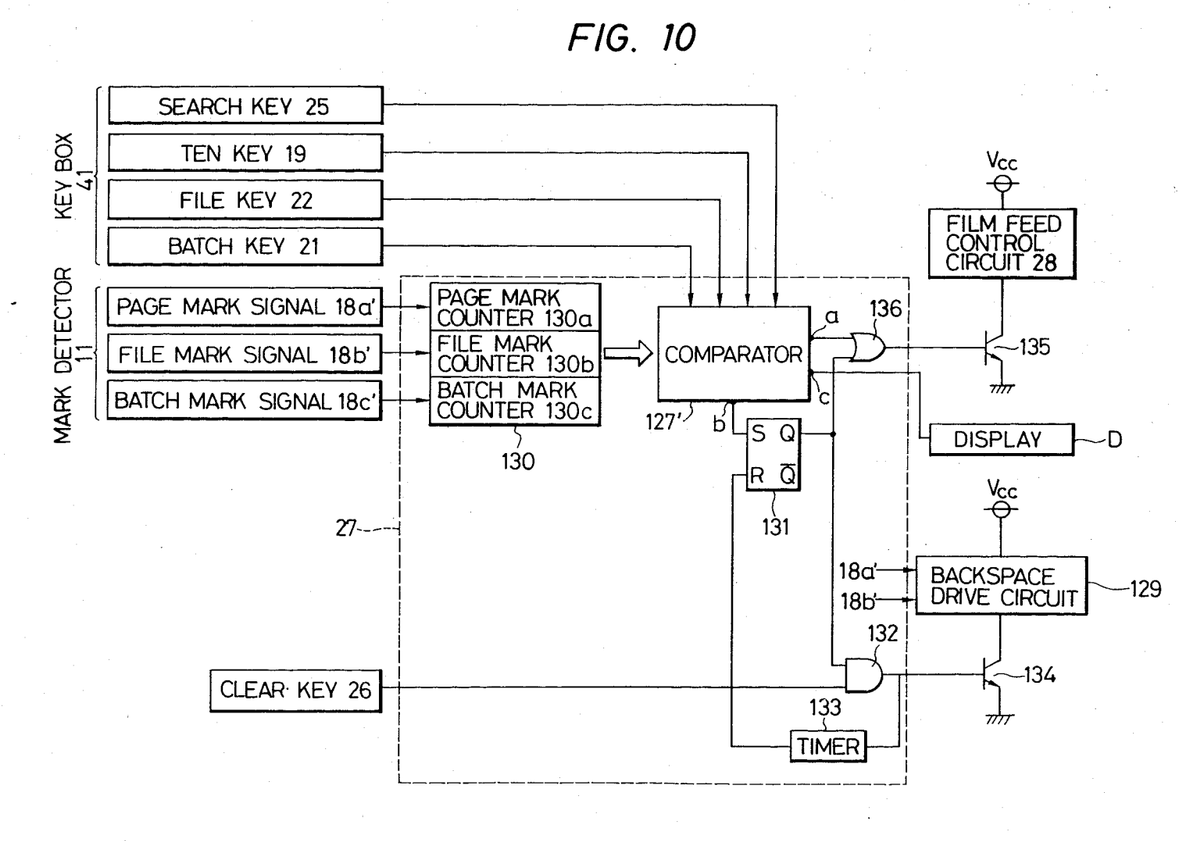
FIG. 10 is a block diagram of a retrieval control circuit for an automatic retrieval, and FIG. 11, consisting of FIGS. 11A and 11B, is a flow chart for an automatic retrieval operation.

FIG. 10 shows a block diagram of the retrieval control circuit for the automatic retrieval. Numeral 130 denotes a counter which comprises a counter 130a for counting page mark signals 18a′, a counter 130b for counting file mark signals 18b′ and a counter 130c for counting batch mark signals 18c′.

Those mark counters count up the input mark signals when the film F2 is forward fed in the take-up direction by the take-up reel 13, and count down the input mark signals when the film F2 is backward fed in the rewind direction by the cartridge 2. The page mark counter 130a is reset to "0" or "1" when the mark detector 11 detects the file mark MF, and the file mark counter 130b is reset to "0" when the mark detector 11 detects the batch mark MB.

The retrieval control circuit 27 includes a comparator 127 which compares the numbers of batch, file and page entered by the input device (key box) 41 with the counts of the mark counters of the counter 130. Numeral 131 denotes a flip-flop circuit, numeral 132 denotes an AND gate, numeral 133 denotes a timer and numeral 136 denotes an OR gate.

When the numbers of the classes (batch, file and page) entered by the input device 41 are equal to the counts of the corresponding mark counters of the counter 130, the comparator 127 produces a film stop signal at a terminal a, and when the input batch number and the count of the batch mark counter or the input file number and the count of the file mark counter once become equal and then become unequal (determined as misentry), the comparator 27 produces signals at terminals b and c.

The retrieval may be done by feeding the film either forward or backward. In the following description, the film is fed forward by the retrieval start signal. When the film is backward fed, a frame having the batch mark of the batch to which the desired frame belongs is retrieved and then the film is forward fed to retrieve the desired frame.

Figure 9A:
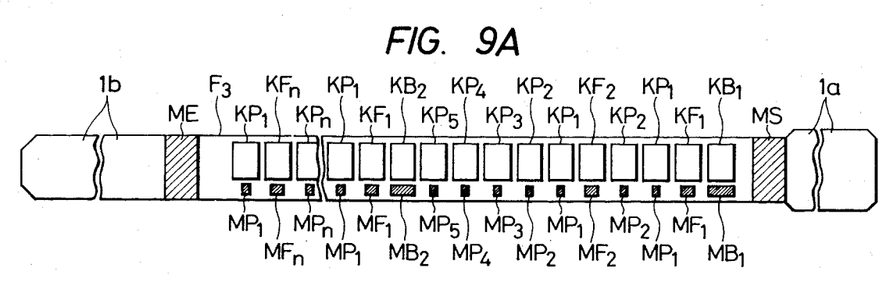
FIGS. 9A and 9B are front views of other examples of the microfilms.

FIG. 9A shows another example of the microfilm. Many types of retrieval marks may be used for the roll microfilm. FIG. 9A shows a so-called 3-level blip mode. KB (1, 2, . . . ), KF (1, 2, . . . ) and KP (1, 2, . . . ) denote batch frames, file frames and page frames which are information frames (negative or positive) sequentially recorded longitudinally of the roll film F3. MB (1, 2, . . . ), MF (1, 2, . . . ) and MP (1, 2, . . . ) denote frame retrieval marks recorded on the edge of the film corresponding to the respective frames. The three types of marks are square marks having size (or length) relationship of MB>MF>MP. The page frame KP is a unit information frame having substantial information recorded thereon. The file frame KF is a medium class heading frame recorded in front of one set of page frames KP (1, 2, . . . ) (one set may comprise at least one page frame). The batch frame KB (1, 2, . . . ) is major class heading frame recorded in front of the first file frame KF (1, 2, . . . ) of one set of file frames KF (1, 2, . . . ). Take a book as an example, the batch frames KB (1, 2, . . . ), the file frames KF (1, 2, . . . ) and the page frames KP (1, 2, . . . ) correspond to chapters, paragraphs and pages, respectively, of the book. Numeral 1a denotes the leader tape at the leading edge of the film F3, numeral 1b denotes a leader tape at the trailing edge of the film F3. The leader tape 1b is wrapped around the core of the reel in the cartridge ME denotes a block end mark at a junction of the trailing edge of the film 1 and the leader tape 1b.

In the present embodiment, the retrieval marks MB, MF and MP of the film F3 are counted in the following manner. For the batch marks MB, the first mark $MB_1$ is counted as "1" and the subsequent marks are sequentially counted to the last one. For the file marks MF, the first file mark $MF_1$ of the file marks MF (1, 2, . . . ) in each batch is counted as "1" and the subsequent marks are sequentially counted but the count is reset each time a new batch is started. For the page marks MP, the first page mark $MP_1$ of the page marks MP (1, 2, . . . ) in each file is counted as "1" and the subsequent marks are sequentially counted but the count is reset each time a new file is started.

After the automatic retrieval of the desired information frame and the projection or print of the retrieved information frame, the next desired information frame address is entered by the key box 41. The control circuit determines whether the newly entered information frame is on the side of the film take-up reel 13 or the cartridge 2 relative to the position of the mark detector 11, based on the address of the retrieved information frame which is now positioned at the apertures 11c and 11d of the mark detector 11. The film take-up motor 4 or the film rewind motor 3 is driven so that the film F3 is fed toward the take-up reel 13 or the cartridge 2 to automatically position the desired information frame at the apertures 11c and 11d of the mark detector 11.

Figure 9B:
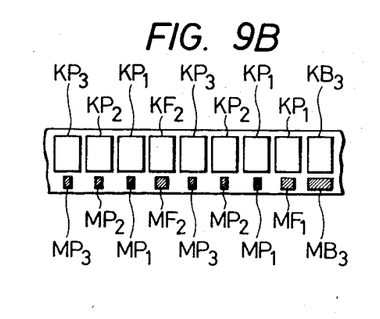

In the prior art information frame retrieval system, if a frame address which does not exist in the film F3 loaded in the apparatus is set, by mistake, as a frame address to be retrieved and the search key 25 is depressed to start the automatic retrieval (hereinafter it is referred to as misentry retrieval), more particularly, when the frame KP2 in the batch 3, file 1 and page 2 (FIG. 9B) is to be retrieved and the batch number "3"

and the file number "1" were correctly entered but the page number "2" was erroneously entered as "5" which does not exist in batch 3, file 1 and the search key 25 was depressed to start the automatic retrieval, the film F3 in the cartridge 2 would be taken up by the take-up reel 13 without the misentered address being found, and finally the end mark ME of the film F3 reaches the mark detector 11, the film feed is stopped, and the error is displayed on the display D. The same is true when the batch number or the file number is misentered.

The operator then notices the misentry of the frame address, releases the error alarm, moves the film F3 to position the last frame of the film at the apertures 11c and 11d of the mark detector 11, checks the address of the last frame and enters that address as a reference address for reretrieval, reenters the correct address, the batch 3, file 1 and page 3 of the desired information frame, and executes the automatic retrieval.

However, since the error alarm is displayed after the film F3 has been taken up to the position of the end mark ME, time is wasted. Further, many key operations are required to restart the automatic retrieval after the operator has noticed the misentry from the error alarm display. It is, therefore, time consuming and troublesome.

In accordance with the present invention, the operation of the apparatus when the misentry retrieval is detected is improved to reduce the time for reretrieval and improve the operability so that a practical information retrieval system is provided.

Figures 11, 11A:
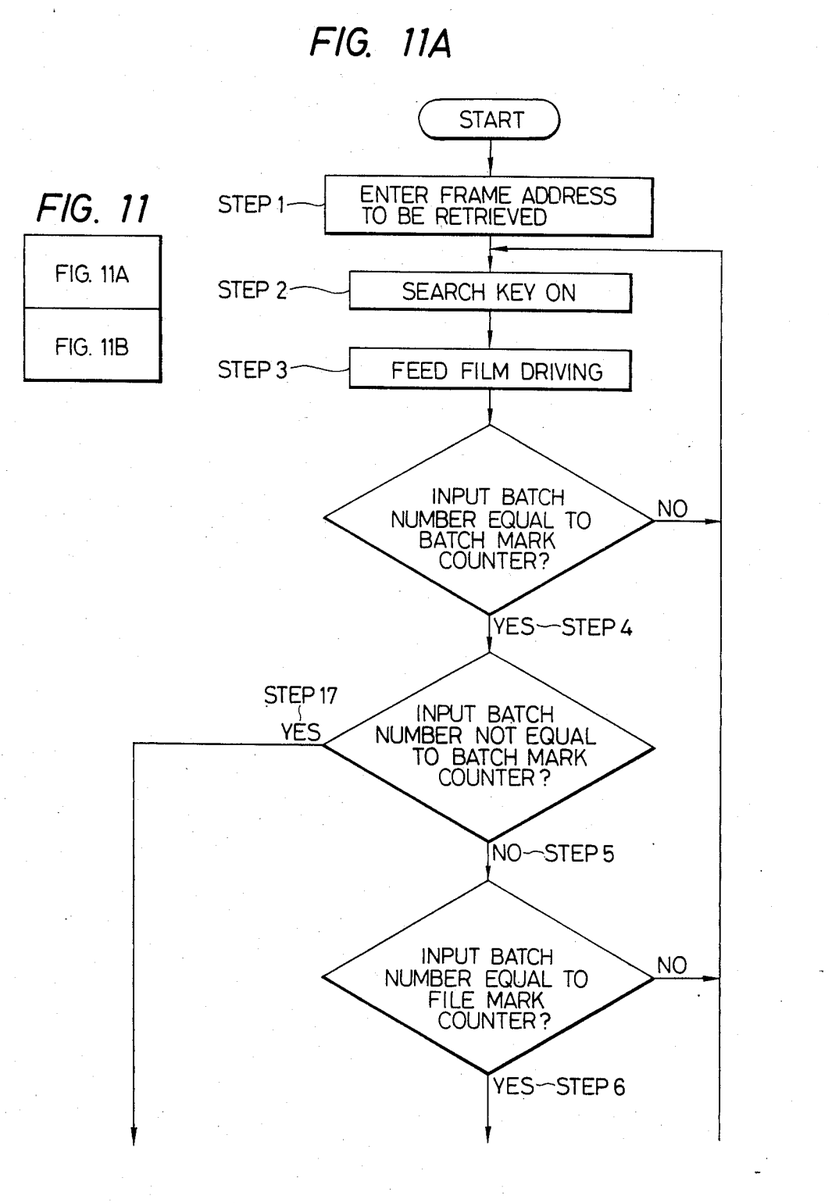
Figure 11B:
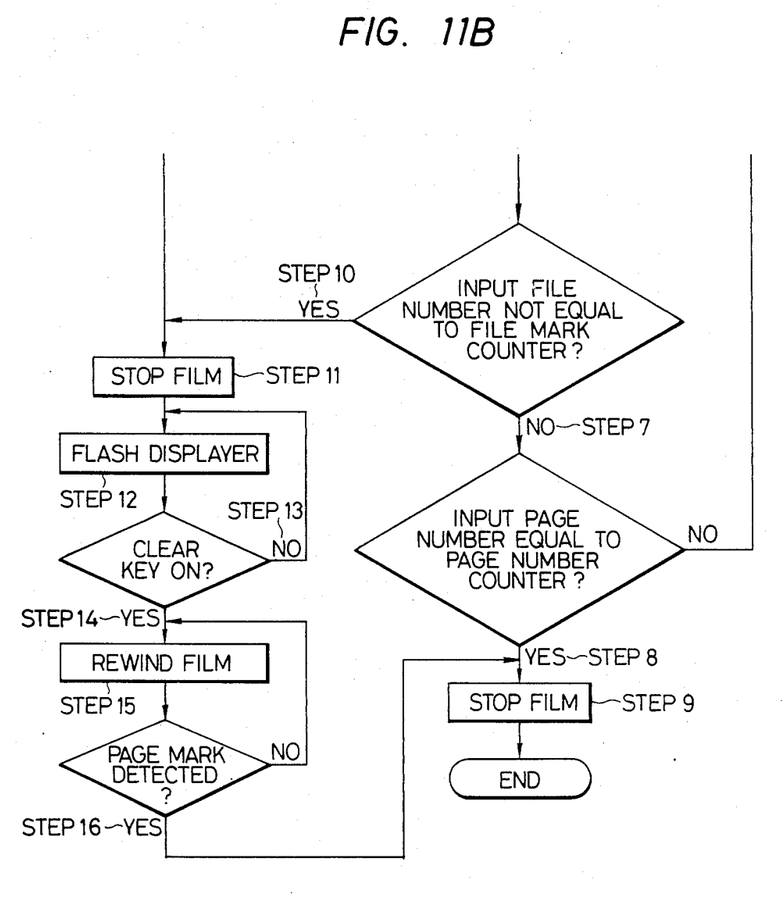

FIG. 11, consisting of FIGS. 11A and 11B, shows a flow chart for the automatic retrieval system.

(a) Normal Retrieval

When a frame address to be retrieved is entered by the input device 41 to the retrieval control circuit 27 (step 1) and the search key 20 is turned on (step 2), the film F3 is fed forward (step 3) and the retrieval is started. Thus, the mark detection signals 18c', 18b' and 18a' of the batch, file and page are sequentially supplied from the mark detector 11 to the counter 130 and those mark detection signals are counted by the mark counters 130c, 130b and 130a of the counter 130. When the counts of the batch mark counter 130c, the file mark counter 130b and the page mark counter 130a match with the entered batch number, file number and page number, respectively (steps 4–8), the comparator 127 produces the stop signal at the terminal a. As a result, the transistor 135 is activated and the motor 4 is stopped by the film feed control circuit 28 so that the film feed is stopped (step 9). When the information frame at the entered address comes to the apertures 11c and 11d of the mark detector 11, the rotation of the take-up reel 13 is stopped and the image on that frame is projected on the screen (not shown) by the optical system 40. Alternatively, the image is printed by depressing the print button.

(b) Misentry Retrieval

Let us assume that the frame address, batch 3, file 1, page 2 is to be entered to retrieve the frame KP$_2$ in FIG. 9B but actually the page number is misentered, that is, a page number 5 which does not exist in the batch 3, file 1 is entered by mistake and automatic retrieval is started. In the course of the automatic retrieval, the count of the batch mark counter matches the entered batch number (steps 4 and 5), and then the count of the file mark counter matches the entered file number (steps 6 and 7). The page marks MP in the batch 3, file 1 are sequentially counted. When the last page mark MP3 in that file is counted, the next file mark MF2 will be counted. Accordingly, the count of the page mark counter 130a is reset and the count of the file mark counter 130b does not match the entered file number (step 10).

As a result, the misentry is detected and the error signal is produced at the terminal b of the comparator 127 when the file mark counter 130b counts the next file mark MF2. The flip-flop 131 is set by the error signal. A "1" signal is produced at the Q-output of the flip-flop and the transistor 135 is turned on through the OR gate 136, the motor is stopped by the film feed control circuit 128 and the film is stopped with the file frame KF2 corresponding to the file mark MF2 being positioned at the apertures 11c and 11d of the mark detector 11 (step 11).

When the error signal is produced at the terminal b, the alarm signal is produced at the terminal c so that the display D is flashed to give an error alarm to the operator (step 12). The alarm may be display of an error mark or character on the display, buzzer sound or an alarm lamp. The error alarm is continued until the clear key 26 is next depressed (step 13).

When the operator depresses the clear key 26 (step 14), the error alarm is released and a signal "1" is produced by the AND gate 132. As a result, the transistor 134 is turned on and the film backspace drive circuit 129 is activated (step 15). Thus, the film F3 is backspaced by one frame and the film is stopped when the mark detector 11 detects the page mark MP3. That is, the film is stopped when the frame immediately previous to the file frame KF2, that is the frame KP3 at the batch 3, file 1 and page 3 is positioned at the apertures 11c and 11d of the mark detector 11 (steps 15, 16, 9). At the same time, the timer 133 is started and after the predetermined time the flip-flop 131 is reset.

Thereafter, the correct desired film address is reentered by the input device 41 and the search key 25 is depressed. Thus, the reentered address is displayed on the display D and the frame at the reentered correct address is automatically retrieved based on the stored frame address. Alternatively, the (+) and (−) keys may be depressed to feed the film frame by frame to find the desired frame.

In the above example, the page number is misentered. If the file number is misentered, the count of the batch mark counter does not match the entered batch number when the next higher class mark, that is, the batch mark is counted. Thus, the misentry is detected and the process jumps from the step 7 to the steps 11–16 and 9.

In accordance with the present invention, even if the misentry takes place, the film is not taken up to the end of the film as was done in the prior art apparatus but the take-up of the film is stopped when the next file mark or the next batch mark to the misentered frame address is counted and the error alarm is issued so that the operator notices the misentry. Accordingly, the time loss is prevented because the film is not taken up to the end.

The reretrieval of the correct frame address can be started from the temporarily stopped frame of the film and the keying operation required therefor is simple. Accordingly, the reretrieval time for the misentry retrieval is reduced and the operability of the system is improved.

While the marks are arranged on a line in the above embodiment, the page marks, the file marks and the batch marks may be arranged on different lines on the film. In this case, the mark detection means are arranged on the paths of the respective marks.

What is claimed is:

1. An information retrieval system for retrieving desired information from an information record media having at least first marks attached to lower class information and second marks attached to higher class information;
   feed means for feeding said information record medium;
   mark detection means for detecting said first marks and said second marks;
   feed control means for stopping said information record medium when said mark detection means detects said first mark during the feed of said information record medium and feeding said information record medium a preset time after the stop; and
   feed inhibit means for inhibiting the feed of said information record medium when said mark detection means detects said second mark during the feed of said information record medium.

2. An information retrieval system according to claim 1 wherein said feed control means includes a timer started by an output of said mark detection means, said information record medium being stopped for a time preset by said timer.

3. An information retrieval system according to claim 1 wherein said first marks and said second marks are of different shapes and arranged on the same line on said information record medium.

4. An information retrieval system according to claim 1 wherein the inhibition of the feed of said information record medium is released by a retrieval instruction inputted by input means.

5. An information retrieval system for retrieving desired information from an information record medium having at least first marks attached to lower class information and second marks attached to higher class information, comprising:
   feed means for feeding said information record medium;
   mark detection means for detecting said first marks and said second marks;
   first counting means for counting an output signal produced by said mark detection means when said mark detection means detects said first mark;
   second counting means for counting an output signal produced by said mark detection means when said mark detection means detects said second mark;
   input means for inputting a lower class address and a higher class address of information to be retrieved; and
   feed control means for stopping said information record medium when the content of said second counting means mismatches said higher class address inputted by said input means after said content and said address matched during the feed of said information record medium.

6. An information retrieval system according to claim 5 further comprising second feed control means for stopping said information record medium when the content of said first counting means mismatches said lower class address inputted by said input means after said content and said address matched.

7. An information retrieval system according to claim 5 further comprising third feed control means for feeding said information record medium in the reverse direction after the stop of said information record medium.

8. An information retrieval system according to claim 7 wherein said third feed control means stops said information record medium when said mark detection means detects said first mark during the reverse feed of said information record medium.

9. An information retrieval system according to claim 5 wherein said first marks and said second marks are of different shapes and arranged on the same line on said information record medium.

10. A film retrieval system for retrieving a desired frame from a film having a number of frames having information recorded thereon and displaying the information recorded on the retrieved frame, said film having at least first marks attached to the frames having lower class information recorded thereon and second marks attached to the frames having higher class information recorded thereon, said film retrieval system comprising:
    mark detection means for detecting said first marks and said second marks on said film;
    feed means for feeding said film;
    display means for displaying information recorded on the film;
    instruction means for instructing intermittent feed of film for displaying said information frame by frame;
    feed control means for controlling to feed said film in response to the instruction of said instruction means so as to stop the film when said mark detection means detects said first mark and thereafter feed said film after a predetermined stop time has passed; and
    feed inhibit means for inhibiting the feed of said film when said mark detection means detects said second mark during the feed of said film.

11. A film retrieval system according to claim 10, wherein said feed control means comprises a timer actuated when said mark detection means has detected said first mark, said time is adjustable and the film is stopped for said preset time of said timer.

12. A film retrieval system for retrieving a desired frame from a film having a number of frames having information recorded thereon and displaying the information recorded on the retrieved frame, said film having at least first marks attached to the frames having lower class information recorded thereon and second marks attached to the frames having higher class information recorded thereon, said film retrieval system comprising:
    mark detection means for detecting said first marks and said second marks on said film;
    feed means for forwardly and backwardly feeding said film;
    first counting means for counting said first marks detected by said mark detection means;
    second counting means for counting said second marks detected by said mark detection means;
    input means for inputting a data to retrieve a desired information; and
    feed control means for stopping said film when the count of said second counting means mismatches the data inputted by said input means after said count and said data matched.

13. A film retrieval system according to claim 12 further comprising second feed control means for feeding said film in the reverse direction after said film has been stopped by said feed control means and stopping said film when said mark detection means detects said first mark during the reverse feed of said film.

* * * * *